United States Patent Office 3,213,080
Patented Oct. 19, 1965

3,213,080
AZO COMPOUNDS FROM AMINOIMIDAZOLES
Melvin S. Bloom and Edmund B. Towne, Kingsport, Tenn., assignors to Eastman Kodak Company, Rochester, N.Y., a corporation of New Jersey
No Drawing. Filed Nov. 13, 1962, Ser. No. 237,332
7 Claims. (Cl. 260—155)

This invention relates to novel azo compounds obtained by diazotization of aminoimidazoles and coupling with coupling components such as aniline coupling components.

Particular azo compounds of the invention are obtained by diazotization of 5-amino-4-nitroimidazoles and coupling the product with aniline, benzomorpholine and tetrahydroquinoline coupling components.

The azo compounds of the invention have the following general formula

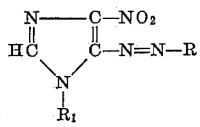

wherein R=
(1) an aniline coupling component residue derived from, for example, aniline or substituted anilines such as m-toluidine, N-methyl-m-toluidine, N,N-di-β-hydroxyethyl-m-chloro-aniline, and other substituted anilines described in the examples hereinafter, or
(2) a benzomorpholine coupling component residue derived, for example, from N-substituted-2-alkyl and 2,5-dialkylbenzomorpholines described below, or
(3) a tetrahydroquinoline coupling component residue derived, for example, from N-substituted-2-alkyl and 2,7-dialkyl-1,2,3,4-tetrahydroquinolines such as described below.

$R_1$=a lower alkyl group, including substituted and unsubstituted, straight or branch-chained, alkyl groups of from 1 to 4 carbon atoms such as methyl, ethyl, propyl and butyl. The azo compounds wherein $R_1$ is methyl, derived from 5-amino-1-methyl-4-nitroimidazole, comprise a preferred embodiment of our invention.

Representative 5-amino-4-nitroimidazoles useful for preparing the azo compounds are, for example, 5-amino-1-methyl-4-nitroimidazole, 5-amino-1-propyl-4-nitroimidazole, 5-amino-1-ethyl-4-nitroimidazole and 5-amino-1-butyl-4-nitroimidazole.

The azo compounds can be used for dyeing textile materials including synthetic polymer fibers, yarns and fabrics giving a wide range of shades including red, red-violet and red-blue shades when applied by conventional dyeing methods to cellulose ester fibers. The azo compounds dye polyester fibers and polyamide fibers such as nylon, as well as wool and silk fibers. The azo compounds have little affinity for cotton and viscose fibers. When the azo compounds are used for dyeing such hydrophobic materials they should be free of water-solubilizing groups such as sulfo and carboxyl groups. In general, the dyes have good fastness, for example, to light, washing, gas (atmospheric fumes) and sublimation. The dyes are useful in application and discharge printing.

The following examples will serve to illustrate the preparation of representative intermediates and azo compounds of the invention.

EXAMPLE 1

*Preparation of 5-amino-1-methyl-4-nitroimidazole*

N,N-dimethyloxamide M.P. 212–215° C. is prepared from ethyl oxalate and aqueous methylamine solution as described by O. Wallach Ann. 214, 257 (1882) and then reacted with $PCl_5$ to yield 5-chloro-1-methylimidazole, B.P. 83° C./7 mm. which is treated with nitric acid to yield 5-chloro-1-methylimidazole nitrate M.P. 139–142° C. which is added to conc. sulfuric acid to obtain 5-chloro-1-methyl-4-nitroimidazole by the method of Balaban and Pyman, J. Chem. Soc. 1564 (1924). The chloro compound is then heated with anhydrous ammonia in ethanol at 140° C. for 4 hours in a rocking autoclave to obtain 76% yield of 5-amino-1-methyl-4-nitroimidazole, M.P. 299° C. (d.) after recrystallization from water. Calculated for $C_4H_6O_2N_2$: C, 33.80; H, 4.23; N, 39.44. Found: C, 33.98; H, 4.41; N, 39.51.

EXAMPLE 2

*(A) Diazotization*

Nitrosylsulfuric acid is prepared by adding 0.90 g. (0.013 mole) of sodium nitrite portionwise to 6 ml. of conc. sulfonic acid with stirring and allowing the temperature to rise to 65° C. The solution is then cooled to 5° C., and 10 ml. of a mixture of 1.5 ml. of propionic acid and 8.5 ml. of acetic acid is added dropwise with stirring, allowing the temperature to rise to 15° C. and keeping there during the addition. The solution is cooled to 0–5° C. and 1.7 g. (0.012 mole) of 5-amino-1-methyl-4-nitroimidazole is added portionwise while stirring, after which 10 ml. more of the propionic acetic acid mixture is added, keeping the temperature at 0–5° C. The reaction mixture is then stirred at 0–5° C. for 2 hours and the excess nitrosylsulfuric acid is destroyed by adding 0.1 g. of urea. The clear diazonium salt solution is then coupled as follows:

*(B) Coupling*

To a solution of 0.78 g. (0.004 mole) of N,N-bis(2-hydroxyethyl)-m-toluidine in 10 ml. of propionic acid mixture, cooled to 0° C., is added with stirring one-third of the above diazonium salt solution at such a rate that the temperature remains at 0–5° C. Coupling is allowed to proceed for 15 minutes, then the reaction mixture is neutralized to Congo Red with anhydrous sodium acetate. The resulting mixture is taken up in water, filtered and washed with water yielding 0.64 g. (50%) of an azo dye. The dye gives a red-violet color on cellulose acetate fabric, violet on nylon and Verel acrylic fabric, and pink on Kodel polyester fabric. The affinity and fastness of the dye on the various fabrics are satisfactory. The azo dye has the formula

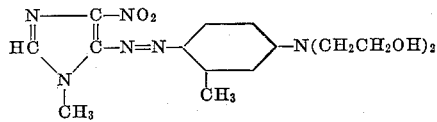

EXAMPLE 3

One-third of the diazonium salt solution prepared in Example 2A is coupled with 1.09 g. (0.004 mole) of N-(3,3-difluorobutyl) - N - (2,3 - dihydroxypropyl)-m-toluidine using the procedure described in Example 2B. There is obtained 0.6 g. (35%) of the azo dye. It dyes cellulose acetate fabric red-violet and nylon fabric violet. The affinity and fastness of the dye are satisfactory.

Example 4

One-third of the diazonium salt solution prepared in Example 2A is coupled with 0.95 g. (0.004 mole) of 2,5-dimethyl-1-(2,3-dihydroxypropyl)-benzomorpholine using the procedure described in Example 2B. The dye is obtained in 46% yield (0.7 g.). It dyes cellulose acetate fabric violet shades and nylon fabric blue violet shades. The affinity and fastness are satisfactory.

The azo compounds described in the following table are prepared in the manner of the above examples using the indicated nitroimidazole diazonium component and the indicated aniline, benzomorpholine and tetrahydroquinoline coupling components. The cellulose ester of the dyeings is a cellulose acetate fabric.

| Diazonium Component | Coupling Component | Color of Cellulose Ester Dyeings |
|---|---|---|
| 5-Amino-1-methyl-4-nitroimidazole. | N-methyl-m-toluidine | Red-Violet. |
| Do | β-(N-ethylanilino)ethyl phenyl carbamate. | Do. |
| Do | β-(N-methyl-m-toluidino)-ethyl phenyl carbamate. | Do. |
| Do | β-(N-cyanoethyl-m-toluidino)-ethyl phenyl carbamate. | Do. |
| Do | N-Ethyl-N-β-acetyloxy ethyl-m-toluidine. | Do. |
| Do | N-β-cyanoethyl-N-β-benzoyloxy ethyl-m-toluidine. | Red. |
| Do | N-β-Cyanoethyl-N-β-acetyloxy-ethyl-m-toluidine. | Red-Violet. |
| Do | N,N-Di-β-Hydroxyethyl-m-chloroaniline. | Red. |
| Do | N,N-Di-β-Hydroxyethyl-m-toluidine. | Red-Violet. |
| Do | N-β-Hydroxyethyl-N-β-methoxyethylaniline. | Do. |
| Do | N-β-Cyanoethyl-N-hydroxyethylaniline. | Red. |
| Do | N-β-Cyanoethyl-N-ethyl-m-toluidine. | Do. |
| Do | N-(2-Methyl-2,3-dihydroxypropyl)aniline. | Red-Violet. |
| Do | N-β-Sulfoethyl-N-phenylaniline. | Do |
| Do | N-β-Hydroxyethyl-N-β-difluoroethyl-m-toluidine. | Red. |
| Do | N-Ethyl-N-2,3-dihydroxypropyl-m-toluidine. | Red-Violet. |
| Do | N,N-Di-β-Hydroxyethyl-2-methoxy-5-acetamidoaniline. | Red-Blue. |
| Do | N-2,3-Dihydroxypropyl-2,7-dimethyltetrahydroquinoline. | Do. |
| Do | N-β-Cyanoethyl-N-β-acetyloxy-ethyl-m-chloroaniline. | Red. |

In the manner of the above examples the other 1-lower alkyl-5-amino-4-nitroimidazoles may be synthesized and coupled with the indicated aniline, benzomorpholine and tetrahydroquinoline couplers to obtain azo compounds useful for dyeing.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of cellulose acetate fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the formula:

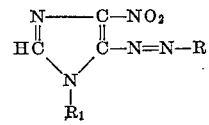

wherein:
R = a member of the class consisting of an aniline, 2,5-dimethyl-1-(2,3-dihydroxypropyl) - benzomorpholin-6-yl and N-2,3-dihydroxypropyl-2,7-dimethyltetrahydroquinolin-6-yl coupling component residues free of water solubilizing carboxyl and sulfonic acid groups $R_1$ = a lower alkyl group.

2. Azo compounds having the formula of claim 1 wherein
R = an aniline coupling component residue free of water-solubilizing carboxyl and sulfonic acid groups.
$R_1$ = methyl 3. The azo compound

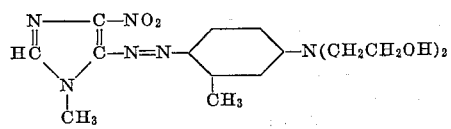

4. The azo compound

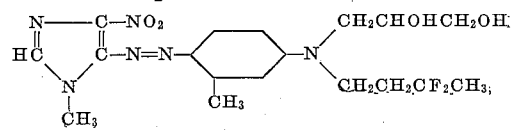

5. The azo compound
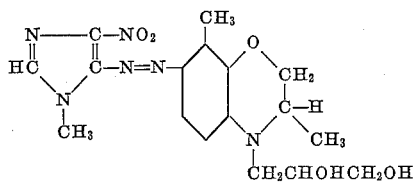
6. The azo compound
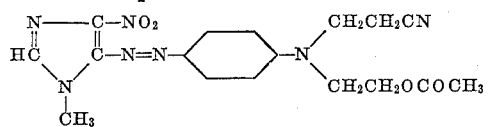
7. The azo compound
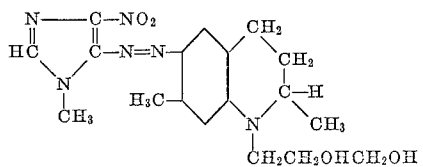
References Cited by the Examiner
FOREIGN PATENTS
774,611   5/57   Great Britain.
CHARLES B. PARKER, *Primary Examiner.*